Figure 1:
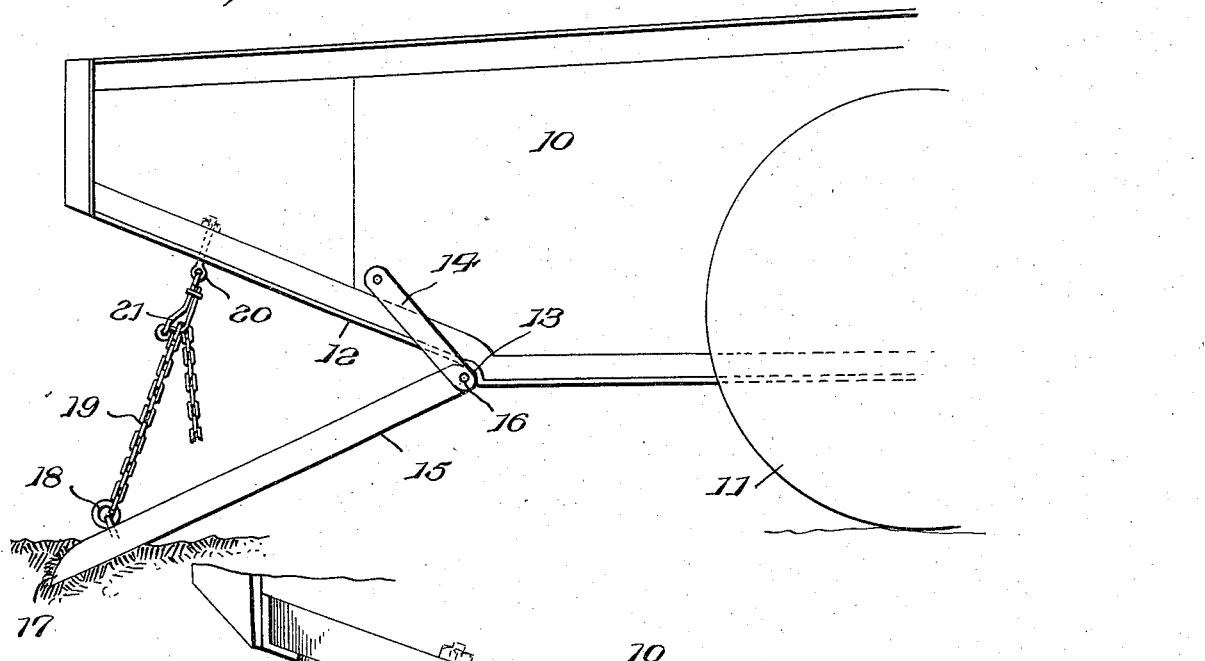

O. W. SIEBENHAAR.
SPRAG BRAKE FOR TRACTORS.
APPLICATION FILED MAR. 29, 1915.

1,178,757.

Patented Apr. 11, 1916.

Witnesses
W. N. Woodson,
W. H. Woodman.

Inventor
O. W. Siebenhaar.

By
Attorneys

UNITED STATES PATENT OFFICE.

OTTO W. SIEBENHAAR, OF ROSENDALE, WISCONSIN.

SPRAG-BRAKE FOR TRACTORS.

1,178,757.   Specification of Letters Patent.   Patented Apr. 11, 1916.

Application filed March 29, 1915. Serial No. 17,734.

*To all whom it may concern:*

Be it known that I, OTTO W. SIEBENHAAR, a citizen of the United States, residing at Rosendale, in the county of Fond du Lac and State of Wisconsin, have invented certain new and useful Improvements in Sprag-Brakes for Tractors, of which the following is a specification.

My invention relates to new and useful improvements in brakes and more particularly in sprag brakes for use upon tractors, the primary object of my invention being the provision of a novel form of sprag brake which may be more readily withdrawn from the ground when the tractor is started than can the types now commonly in use.

More specifically my invention consists in the provision of a sprag brake for tractors of that type employed in ditching purposes in which the tractor is kept stationary in the field being ditched and the ditch formed by means of a plow or other ditching implement attached to a cable which is wound upon a windlass carried by the tractor and usually driven by power. With such a ditching tractor, it will be clear that there is a considerable drag upon the tractor, tending to draw it toward the ditching implement proper and that this drag must be overcome by a brake of one type or another, a sprag brake being preferred for a number of reasons which need not be stated. As this ditching is oftentimes done for the purposes of draining marshy ground, it will be clear that inasmuch as the tractor oftentimes remains in the same spot for a period of time, its drive wheels will sink to a more or less extent into the ground, requiring considerable power to start the tractor ahead, due to the necessity of extracting the wheels from the ground. With the ordinary type of sprag brake, now in common use, still more power is required as the sprags constituting the brakes must be drawn from the ground at the same time that the wheels are being drawn from the depressions into which they have sunk.

A still further object of my invention consists in so mounting a sprag brake that upon first starting ahead of the tractor, the brake will remain embedded in the ground, permitting the tractor to move for a sufficient distance to bring its drive wheels out of any depressions into which they may be sunk before any direct strain, tending to draw the sprag from the ground, is exerted.

A still further object of my invention is to so mount the sprag proper of the brake that, although this independent movement between the sprag and the tractor is permitted, the strain upon the sprag, in use, is applied directly to the sprag and not to the connecting means between the sprag and tractor.

With these and other objects in view, my invention will be more fully described, illustrated in the accompanying drawing, and then specifically pointed out in the claims which are attached to and form a part of this application.

Figure 2:
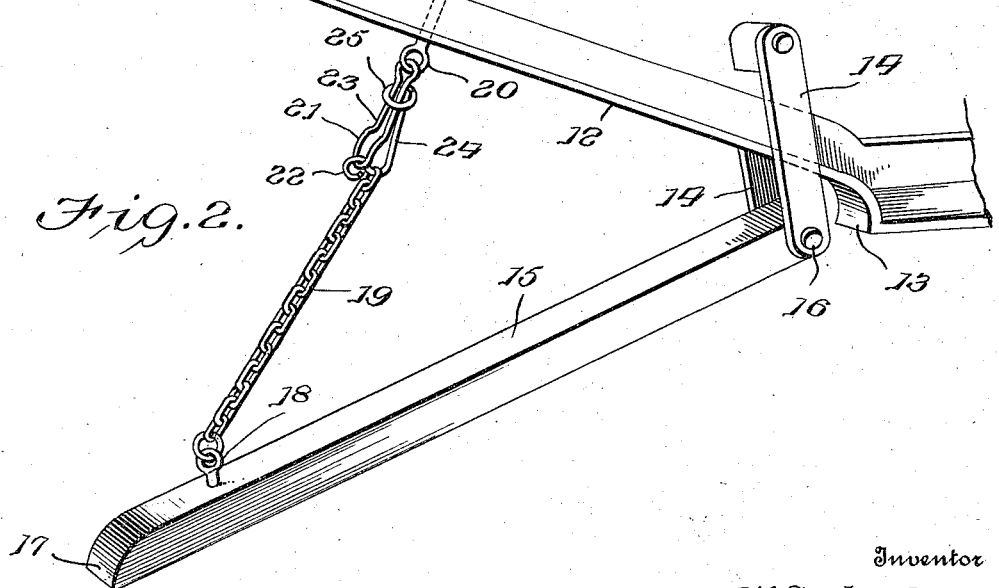

In the drawing: Figure 1 is a fragmentary side elevation of a conventional form of ditching tractor, showing one of my improved sprag brakes in use; Fig. 2 is a fragmentary perspective view of the structure shown in Fig. 1, the sprag being shown in elevated position.

Corresponding and like parts are referred to in the following description and indicated in all the views of the drawing by the same reference characters.

In the drawing, 10 indicates one of the side frame members of the tractor and 11 one of the traction wheels thereof, the rear lower edge portion of the tractor frame being inclined upwardly as shown at 12. In order to adapt it to receive my improved sprag brake, this inclined edge 12 is preferably provided adjacent its lower end with an arcuate seat or shoulder 13. Links 14 are pivotally secured at their upper ends to opposite sides of the frame member 10 and are of such length that their free ends, when swung back, will be in alinement with the seat 13. The upper end of the sprag proper 15 is pivotally connected by a bolt 16 or other suitable fastening device between the free ends of the links 14, whereby its upper end may engage the seat 13 when the brake is in use. As a means for supporting the sprag when the brake is not in use, such sprag is provided, at any suitable point, generally near its lower pointed terminal 17, with an eye bolt 18 and a chain 19 is connected to this eye bolt. A second eye bolt 20 is passed through the frame member 10 and carries a hook device, indicated as a whole by the numeral 21 and adapted to engage one of the links of the chain 19 to support the sprag at any desired elevation.

The hook device 21 is formed from a single length of stiff wire, one end of which is bent to form an eye 22 which engages one end of a link 23, the other end of which seats in the eye of the eye bolt 20. The opposite end of the wire forming the eye 22 is extended at substantially right angles to the eye portion, as shown at 24, to a distance slightly less than the length of the link 23 and a ring 25, surrounding the link 23, is movable over the free end of the bill portion 24 of the hook to lock the hook after it has been passed through a chain link. Upward sliding of the ring 25 will, of course, free the bill portion of the hook, permitting it to swing about the lower end of the link 23 of the fastener merely through the weight of the chain 19 and to thus automatically release the chain and permit the sprag to drop.

Before describing the operation of my improved sprag brake, I wish to point out that, under ordinary circumstances, two brakes of the type described will be employed, one being swingingly mounted upon each side frame member of the tractor. In use, after the tractor has been moved to the desired position, the chain is adjusted to permit the sprag to move to active position with its pointed terminal 17 in engagement with the ground, considerable slack of the chain being allowed after the sprag engages the ground. Under these circumstances, any strain exerted to draw the tractor rearwardly will first bring the upper end of the sprag into engagement with the seat 13 and subsequently force the pointed lower terminal of the sprag into the ground to the extent permitted by the chain, to prevent further rearward movement of the tractor. It will therefore be seen that the adjustment of the chain determines the angle at which the sprag shall extend in use and, consequently, the depth to which it shall pass into the ground. The entire strain is applied directly to the sprag and longitudinally thereof, no strain being thrown upon the supporting links 14 or pivot bolts 16.

When the tractor is to be moved, the chain is removed from the hook and the tractor started in the usual manner. During the initial portion of the movement of the tractor, no strain will be exerted upon the sprag tending to withdraw it from the ground as the link connection 14 between the tractor frame and sprag will permit forward movement of the tractor without withdrawal of the sprag for a limited distance of tractor movement. Because of this, the tractor may be moved to bring its traction wheels 11 out of any depressions in the ground into which they may have sunk before any force is required to draw the sprag out of the ground. After the tractor has moved a sufficient distance to withdraw the sprag, the bill portion 24 of the hook may be inserted in the proper link of the chain 19, the ring 25 slipped to the upper portion of the link 23 to permit swinging of the bill portion 24 to the position shown in Fig. 2, and the ring again lowered to lock the bill in parallel relation to the link 23.

Although I have illustrated and described my sprag brake in all its details of construction, it will of course be understood that I do not wish to limit myself to such details as various minor changes, within the scope of the appended claims, may be made at any time, without in the slightest degree departing from the spirit of my invention.

Having thus described the invention, what is claimed as new is:

1. In a sprag brake construction, the combination with a vehicle frame member, of a sprag proper, and a link for pivotally connecting the sprag to the frame member, the frame member having a seat to receive the link engaging end of the sprag.

2. In a sprag brake construction, the combination with a vehicle frame member having a seat in its lower edge, of links pivotally connected at one end to opposite sides of the frame member, and a sprag proper pivoted between the free ends of the links and adapted to swing to bring its pivoted end into engagement with the seat.

3. In a sprag brake construction, the combination with a vehicle frame member having a seat in its lower edge, of links pivotally connected at one end to opposite sides of the frame member, a sprag proper pivoted between the free ends of the links and adapted to swing to bring its pivoted end into engagement with the seat, and means for normally supporting the free end of the sprag above the ground.

4. In a sprag brake construction, the combination with a vehicle frame member having a seat in its lower edge, of links pivotally connected at one end to opposite sides of the frame member, a sprag proper pivoted between the free ends of the links and adapted to swing to bring its pivoted end into engagement with the seat, and means for normally supporting the free end of the sprag above the ground, said means including a hook carried by the frame, and a chain connected to the sprag for engagement with the hook.

5. In a sprag brake construction, the combination with a vehicle frame member having a seat in its lower edge, of a link pivotally connected at one end to the frame member and proportioned to be swung to bring its other end in juxtaposition to the seat, and a sprag pivoted to the other end of the link and adapted to engage in the seat.

In testimony whereof I affix my signature in presence of two witnesses.

OTTO W. SIEBENHAAR. [L. S.]

Witnesses:
 ARTHUR J. HENNING,
 JAMES R. HATCH.

Copies of this patent may be obtained for five cents each, by addressing the "Commissioner of Patents, Washington, D. C."